United States Patent [19]

Ookubo et al.

[11] Patent Number: 4,631,795
[45] Date of Patent: Dec. 30, 1986

[54] MANUFACTURING DEVICE OF A CLUTCH COVER ASSEMBLY

[75] Inventors: Mamoru Ookubo, Neyagawa; Takayuki Iwasaki, Ikoma; Kenji Mieda, Hirakata, all of Japan

[73] Assignee: Kabushiki Kaisha Daikin Seisakusho, Osaka, Japan

[21] Appl. No.: 738,789

[22] Filed: May 29, 1985

[30] Foreign Application Priority Data

May 31, 1984 [JP] Japan .................................. 59-112684

[51] Int. Cl.$^4$ ............................................. B23P 11/00
[52] U.S. Cl. .................................. 29/243.52; 29/513; 192/70.18; 192/89 B
[58] Field of Search ................... 29/513, 243.5, 243.52; 192/70.18, 70.27, 89 B

[56] References Cited

U.S. PATENT DOCUMENTS

| | | | |
|---|---|---|---|
| 1,122,280 | 12/1914 | Kempshall | 29/512 UX |
| 2,053,490 | 9/1936 | Novick | 29/512 UX |
| 2,080,750 | 5/1937 | Thompson | 29/512 UX |
| 2,343,983 | 3/1944 | Knowlton | 29/512 |
| 2,746,633 | 5/1956 | Simmons | 29/243.52 |
| 3,685,623 | 8/1972 | Bradshaw | 29/513 X |
| 4,109,368 | 8/1978 | Hubbard et al. | 29/513 X |
| 4,555,005 | 11/1985 | Dixon | 192/89 B X |

Primary Examiner—Charlie T. Moon
Attorney, Agent, or Firm—Burns, Doane, Swecker & Mathis

[57] ABSTRACT

A manufacturing method of a clutch cover assembly comprising an annular clutch cover provided with a plurality of projections, a diaphragm spring, and a pair of wire rings supported by said projections, characterized in that; said method comprises supporting the lower surface of the diaphragm spring, to which the wire rings have been assembled, by a lower die in such a position that said projections project upwardly from a body of the clutch cover; supporting radially inner sides of portions of said projection bodies positioned below the diaphragm spring by a projection body support provided in the lower die; downwardly bending the free ends of the projections, which incline upwardly from the projection bodies, to predetermined positions by an end pushing-down portion provided in the upper die; and supporting radially inner sides of portions of said projection bodies positioned above the diaphragm spring by a projection body support provided in the upper die.

2 Claims, 3 Drawing Figures

MANUFACTURING DEVICE OF A CLUTCH COVER ASSEMBLY

BACKGROUND AND SUMMARY OF THE INVENTION

The present invention relates to a manufacturing device of a clutch cover assembly and a manufacturing method of the same, which is used in a friction clutch of a diaphragm spring type for automobiles and others.

Generally, in a clutch of a diaphragm spring type, a diaphragm spring for forcing a pressure plate is supported by projections or tabs of a clutch cover through wire rings which form fulcrums of the diaphragm spring. However, in manufacturing of such a clutch cover assembly, as shown in FIG. 3, a plurality of the projections 2 integrally formed at the inner periphery of the clutch cover 1 are bent by a hydraulic press device 3 to support the inner peripheries of a pair of the wire rings 5 and 6, and then ends 7 of the projections 2 are further bent by the press device 3 so that the ends 7 may hold the sides opposite to a diaphragm spring 8 of the wire rings 5 and 6.

However, in the conventional press device 3, a lower die 10 of the device 3 is desgned to support only a lower surface of an annular body 11 of a clutch cover 10, and an upper die 12 is designed to push the projection ends 7 downwardly while supporting a radially inner side of each projection body 9 through its whole length by support portions 14. Therefore, in the conventional upper die 12, it is necessary to provide the long projected support portions 14 which are longer than the projection bodies 9, and these long supports 14 receive a large bending moment from the work piece. Therefore, the support portions 14 of the conventional upper die 12 may be broken, which causes interruption of the work. Further, the bending accuracy can not be increased sufficiently because the support portions 14 deform. Moreover, the support portions 14 must be long projections to be extended downwardly through openings 15 in the spring 8. Moreover, the whole support portions 14 have complicated shapes, resulting in a high manufacturing cost.

Accordingly, it is an object of the invention to provide a structure and a manufacturing method, overcoming the above-noted disadvantages, in which portions of projections at free end sides positioned above a diaphragm spring are adapted to be supported by a upper die and portions of the projections at base end sides positioned below the diaphragm spring are adapted to be supported by a lower die.

Other and further objects, features and advantages of the invention will appear more fully from the following description of the preferred embodiments of the invention.

DETAILED DESCRIPTION OF THE PREFERRED EMBODIMENTS

Figure 2:
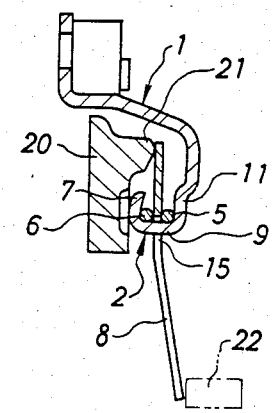
FIG. 2 is a schematic fragmentary sectional view of an assembled clutch cover assembly.
Figure 3:
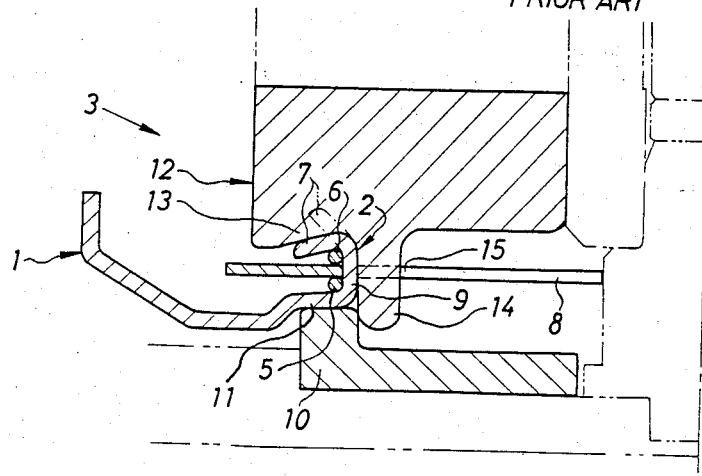
FIG. 3 is a schematic fragmentary vertical sectional view of a conventional device.

Initially, referring to FIG. 2, an assembled and completed structure will be detailed. A pressure plate 20 is covered from its outer peripheral side and rear side by a clutch cover 1, of which radially outer portion is fixed to a flywheel (not shown) of an engine. The pressure plate 20 is provided at the rear surface with protrusions 21, which outer peripheral portions of an annular diaphragm spring 8 contacts. A pair of wire rings 5 and 6 contact respective surfaces of a radially middle portion of the spring 8. The wire rings 5 and 6 form fulcrums for the spring 8, and are supported from radially inner sides and the sides opposite to the spring 8 by projections 2 of the clutch cover 1. A release bearing 22 is faced to the side opposite to the pressure plate 20 of the inner peripheral portion of the spring 8.

The projections 2 are circumferentially spaced and integrally provided at the inner periphery of an annular body 11 of a clutch cover 1, and extend toward the pressure plate 20 through openings 15 provided in the diaphragm spring 8. Free ends 7 of the projections 2 are bent nearly radially outwardly to support the wire ring 6 from the side opposite to the spring 8. A main body 9 of each projection 7, which is a part between an annular body 11 of the clutch cover 1 and the end 7 of the projection 2, extends substantially perpendicularly to the spring 8 through the opening 15 and supports the inner peripheries of the wire rings 5 and 6.

The above clutch cover assembly is manufactured as follows.

Figure 1:
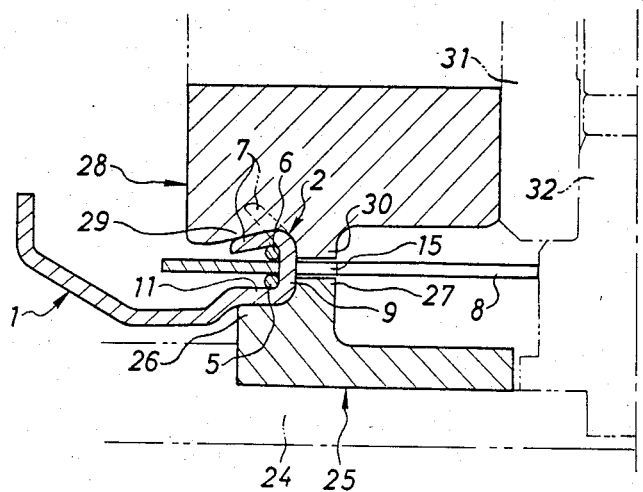
FIG. 1 is a schematic fragmentary vertical sectional view of a manufacturing device for a clutch cover assembly according to the present invention.

A blank of the clutch cover 1 is supplied to bending process shown in FIG. 1 after passing through blanking process, restrike process, bending process and others.

Referring to FIG. 1, an annular lower die 25 is arranged on a base 24. The clutch cover 1 is set on the lower die 25 with the projection bodies 9 projecting upwardly. The wire rings 5 and 6 and the diaphragm spring 8 are assembled to the clutch cover 1. The wire rings 5 and 6 are arranged at the respective sides of the diaphragm spring 8 and the projections 2 are inserted through the openings 15 in the spring 8. In the former bending process (not shown), the projection bodies 9 have been bent perpendicularly to the cover body 11, and, in the condition at the start of the illustrated process, the projection ends 7 are bent, as shown by phantom line, radially outwardly and upwardly to form an obtuse angle with respect to the projection bodies 9.

The lower die 25 is provided at the outer periphery with a support portion 26 and is also integrally provided at the inside of the support portion 26 with a cylindrical support 27 projecting upwardly. The support portion 26 supports the lower surface of the radially inner portion of the cover body 11. The support 27 supports the radially inner sides of the portions of the projection bodies 9 which are positioned lower than the diaphragm spring 8. The upper end surface of the support 27 supports the lower surface of the spring 8.

An upper die 28 (bending punch) is adapted to be raised and lowered by a hydraulic driving device (not shown). The upper die 28 is provided at the outer periphery with a pushing-down portion 29, and is also integrally provided at the inside of the pushing-down portion 29 with a cylindrical support 30 projecting downwardly. The pushing-down portion 29 is provided with a tapered lower surface which inclines downwardly in the radially outward direction and corresponds to intended bending shapes of the projection ends 7. The support 30 supports the radially inner sides of the portions of the projection bodies 9 which are positioned higher than spring 8. In the illustrated lowered position, the lower end surface of the support 30 contacts or is adjacent to the spring 8.

A cylindrical backup member 31 is fixed to the inner periphery of the upper die 28. The member 31 is slidably fitted to a shaft 32 fixed to the center of the base 24.

An operation is as follows. When the upper die 28 is lowered, as illustrated, from the upper position toward the clutch cover 1 set on the lower die 25, the projection ends 7 in the inclined positions shown by the phantom line are bent downwardly by the pushing-down portion 29 to the position shown by solid line. Thus, the wire ring 6 is supported from the side opposite to the diaphragm spring 8 by the projection ends 7, and the wire rings 5 and 6 and the diaphragm spring 8 are securely held in the axial direction (vertically in the illustrated condition).

During this lowering operation, the lower halves of the projection bodies 9 are securely supported from the sides opposite to the wire ring 5 by the support 27. The upper halves of the projection bodies 9 are securely supported from the sides opposite to the wire rings 6 by the support 30. Therefore, error is not generated in the radial position of the projection bodies 9, and thus, the projection bodies 9 securely support the inner peripheries of the wire rings 5 and 6.

In the above operation, the supports 27 and 30 receive a load in a radially inward direction from the projections 2. However, the support 27 has a short length which is same as the vertical length of the portion of each projection 2 positioned above the spring 8. Further, the support 30 also has a short length which is same as the vertical length of the portion of each projection 2 positioned below the spring 8. Therefore, only small bending moments are applied to the supports 27 and 30, and thus, the supports 27 and 30 do not break. Further, since the supports 27 and 30 do not deform, error in the sizes thereof are prevented, resulting in the high bending accuracy.

According to the invention, as stated hereinbefore, since both of the upper and lower dies 25 and 28 are provided with supports 27 and 30, which support the upper and lower halves of the projections 9, respectively, the bending moments applied to the supports 27 and 30 can be small, and thus, the deformation and breakage of the supports 27 and 30 can be prevented. Therefore, the bending accuracy of the projections 2 can be increased, and the interruption of the operation by the breakage can be prevented. The maintenance of the device can be easy. Further, it is not necessary to provide in any of the supports 27 and 30 with projections to be inserted into the openings 15 in the spring 8, and the supports 27 and 30 can simply be cylindrical, resulting in reduction of the manufacturing cost of the lower and upper dice 25 and 28.

Further, since the strength of the dies can be increased as stated above, the present invention can provides a manufacturing device and a method suitable for large clutch covers having large thicknesses.

Although the present invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A manufacturing device for a clutch cover assembly having an annular clutch cover with a body having a surface and provided at the inner periphery with a plurality of projections, a diaphragm spring including openings through which the projections extend, and a pair of wire rings for diaphragm spring fulcrums, said wire rings being supported on opposite sides of the diaphragm spring by said projections, and the inner peripheries of the wire rings being supported by body portions of said projections between free ends of said projections and said clutch cover body; the manufacturing device comprising:

a lower die having a generally planar annular surface and a generally cylindrical lower projection body support disposed radially inside the annular surface, the annular surface being operable to support the lower surface of the clutch cover body with the wire rings and diaphragm spring mounted on the projections in such a position that said projections extend upwardly from the clutch cover body; the lower projection body support extending above the annular surface by a distance no greater than the sum of (a) the thickness of the clutch cover body beneath the wire ring and (b) the cross-sectional diameter of the wire ring and being operable to support radially inner sides of the portions of said projection bodies positioned below the diaphragm spring; and an upper die adapted to be lowered to push down the free ends of the projections; having a generally frustoconical annular surface and a generally cylindrical upper projection body support disposed radially inside of the frustoconical surface, the frustoconical surface being upwardly concave and being operable to downwardly bend the free ends of the projections, which incline upwardly from the projection bodies, to predetermined positions; and the upper projection body support extending downwardly from the contiguous edge of the frustoconical surface by a distance no greater than the sum of (a) the thickness of the free ends of the projections above the wire ring and (b) the cross-sectional diameter of the wire ring, and being operable to support radially inner sides of portions of said projection bodies positioned above the diaphragm spring.

2. A device of claim 1 wherein said upper and lower projection body supports are formed by annular portions.

* * * * *